L. EMBREY.
DOUGH PROVING APPARATUS.
APPLICATION FILED OCT. 3, 1918.

1,334,025.

Patented Mar. 16, 1920.
3 SHEETS—SHEET 1.

Laurence Embrey
by W. J. Bissing
attorney

L. EMBREY.
DOUGH PROVING APPARATUS.
APPLICATION FILED OCT. 3, 1918.

1,334,025.

Patented Mar. 16, 1920.
3 SHEETS—SHEET 3.

Lawrence Embrey
by W. I. Bissing
attorney

UNITED STATES PATENT OFFICE.

LAURENCE EMBREY, OF FENTON, ENGLAND.

DOUGH-PROVING APPARATUS.

1,334,025.   Specification of Letters Patent.   Patented Mar. 16, 1920.

Application filed October 3, 1918. Serial No. 256,701.

*To all whom it may concern:*

Be it known that I, LAURENCE EMBREY, a subject of the King of Great Britain and Ireland, residing at Fenton, Staffordshire, England, have invented certain new and useful Improvements in Dough-Proving Apparatus, of which the following is a specification.

In specification, Serial No. 178,975, I have described apparatus for working pieces or clots of fermented dough preparatory to baking into loaves of bread, and according to which the clots of dough are first molded by coiling to produce tensioned clots which with or without shaping are passed through a prover so that the dough may be subjected to a period of proof before baking or if desired before being subjected to a second molding operation followed by a second period of proof.

I find that it is sometimes desirable that when repeated molding and proving operations are adopted the periods of proof shall vary in length of time. For instance when two molding and proving steps are adopted the period of proof following the first molding operation may be much shorter than the period of proof following the second molding operation.

The object of the present invention is to provide an apparatus similar in principle to that described in the aforesaid specification but which will permit of the periods of proof of different length, and with this object in view the proving apparatus or so called "prover" is provided with a plurality of distinct conveyers which may be of different length.

In the accompanying drawings:—

Figure 1:
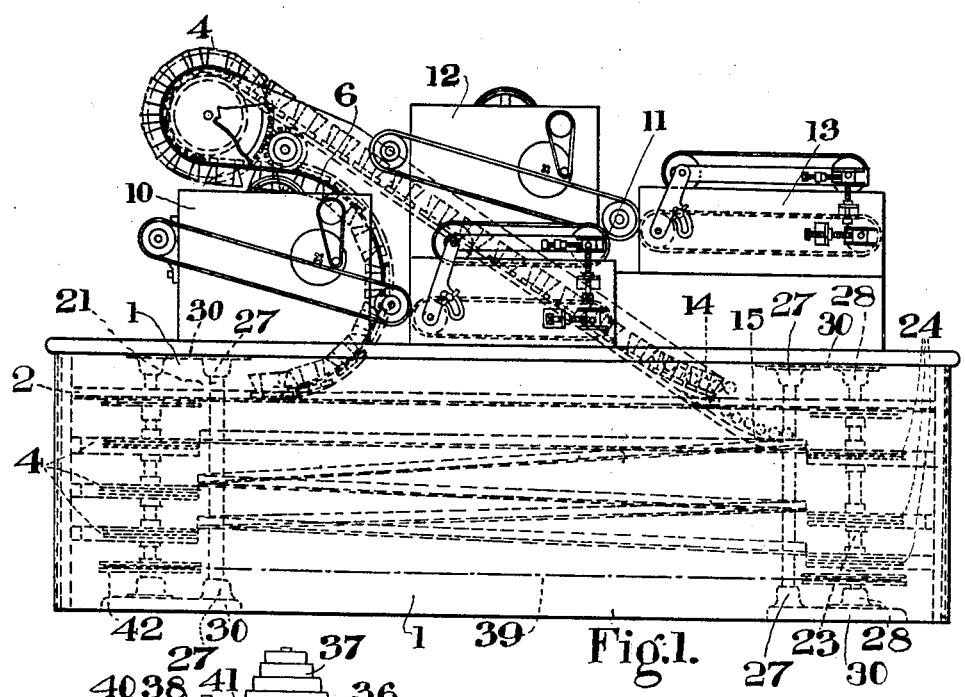
Figures 1, 2 and 3 are, respectively, a front elevation, plan and side elevation of a prover having two endless conveyers, the conveyers being omitted in Fig. 2.
Figure 2:
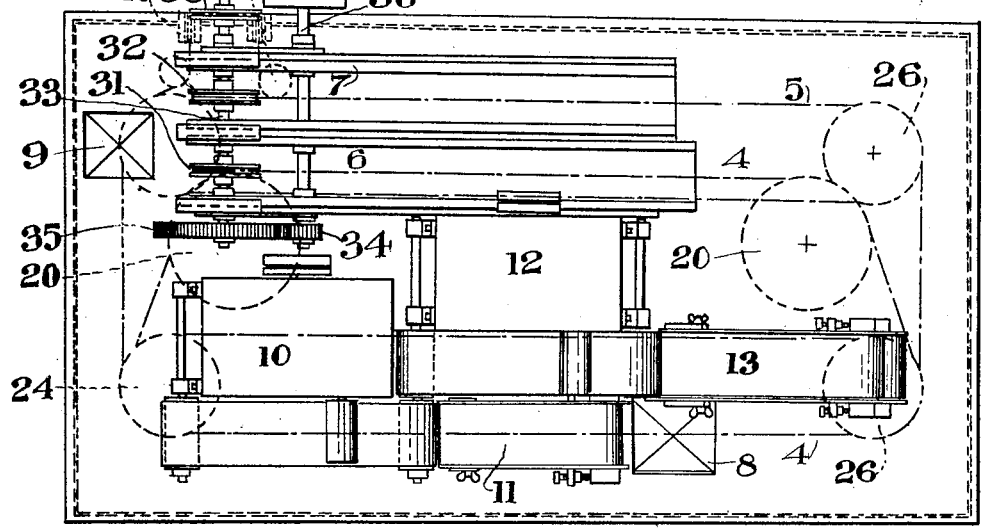
Figure 3:
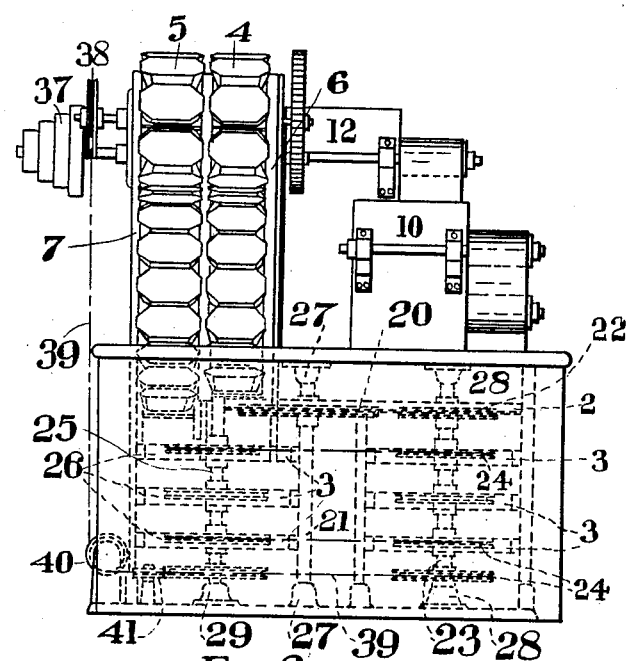
Figure 4:
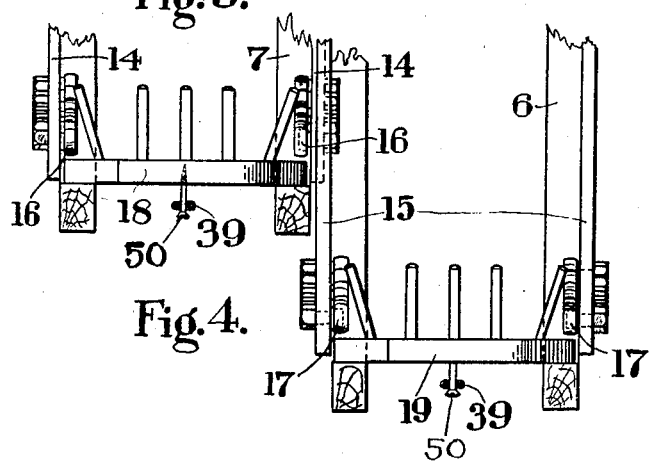
Fig. 4 is an end sectional elevation of details connected with the two tracks.
Figure 5:
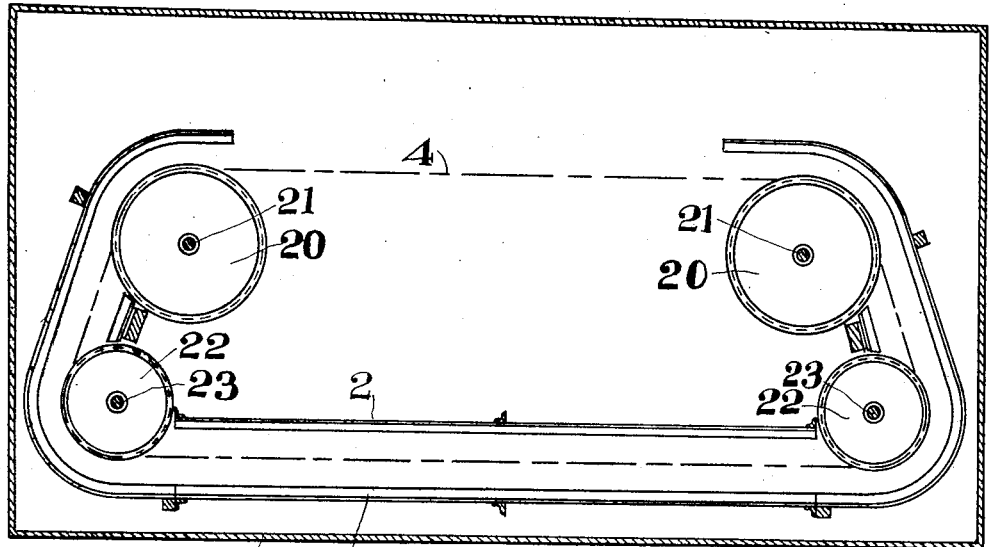
Fig. 5 is a plan of the upper tracks for the short circuit conveyer.
Figure 6:
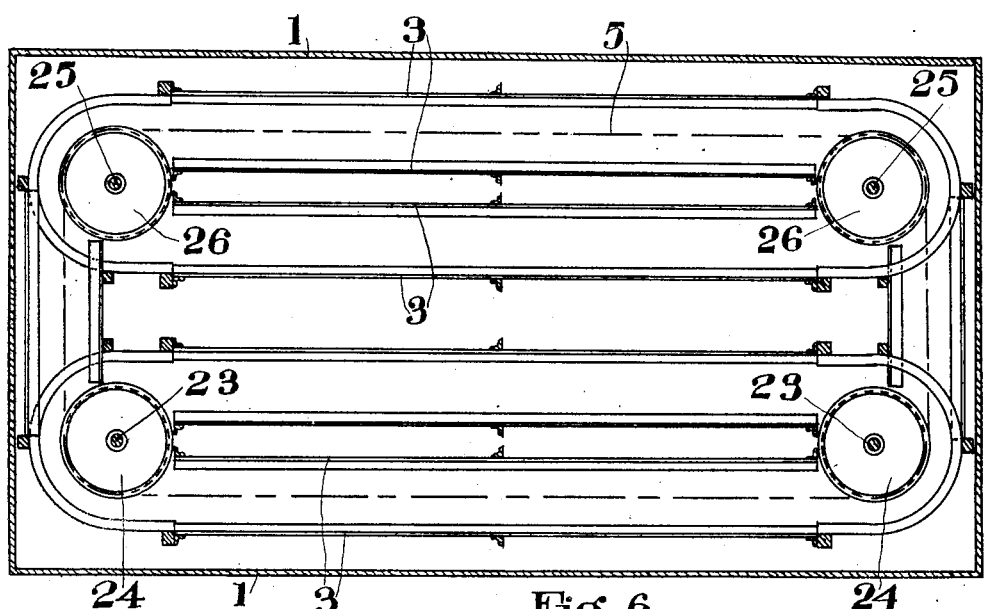
Fig. 6 is a plan of the lower tracks for the long circuit conveyer.

In the apparatus illustrated a casing 1 is provided with two sets of tracks, 2, 3, for two distinct endless conveyers 4 and 5 of the kind described in specification Serial No. 178,975. The upper set of tracks 2 has a comparatively shorter circuit than the lower set. The two sets of tracks have elevated looped portions 6 and 7 for the delivery of the dough, and the top of the casing 1 is provided with separate inlet openings 8 and 9 for feeding the dough into the conveyers. The portions of the tracks which ascend and form the loops are preferably brought out of the casing parallel and close to one another at the rear of the top of the casing as shown in Fig. 2 so as to leave space available in front for molding machines 10, 12, and shaping machines 11, 13, and the necessary feeding bands.

For convenience of construction the tracks are preferably made of angle iron, and, in the positions where the conveyers begin to ascend toward the elevated looped portions, brackets 14, 15, carrying steel guide rollers 16, 17, are provided, above the tracks, to hold and guide the conveyer elements or carriers 18, 19, thereon. The carriers 18, 19, etc., are connected to the chain by pins 50, thus permitting some movement between the carriers and the chain as the chain turns corners and goes around rollers.

The lower or long circuit tracks may comprise two sets of zigzag or spiral tracks, as described in specification Serial No. 178,975, the conveyer passing first around one set and then across to and around the other. The upper or short circuit tracks 2 may simply consist of two portions, one consisting of the elevated or looped portion 6 for which side of this track special pulleys or chain wheels 20 are provided on shafts 21. The pulleys or chain wheels 22 for the other side of the upper track may be on the same shafts 23, as the pulleys 24 for the forward set of the lower or long circuit track. The various vertical shafts 21, 23, 25, for the pulleys 20, 22, 24, 26, are preferably carried in bearings 27, 28, 29, which are formed on plates 30, extending from front to rear of the casing 1. Each plate 30 may thus be utilized to carry bearings for three vertical shafts. The lower plates 30 having the step bearings 27, 28, 29, may be castings while the upper plates 30 may be of mild steel.

The chain wheels or pulleys 31, 32, for the elevated looped portions of the two tracks may be fitted on the same shaft 33, which may be driven at the required speed through spur gearing 34, 35, off a driving shaft 36, fitted with a stepped driving pulley 37 by which the speed may be changed. The chain wheel shaft 33 may have an additional chain wheel or pulley 38 for driving the vertical shafts for the conveyers, the driving chain or cable 39 passing down around guide pulleys 40, 41, and thence around chain wheels or pulleys 42, on the lower ends of the vertical shafts 23, 25.

A proving apparatus as above described may have one, two, or more molding and roller-shaping machines mounted on the top of the casing and suitable conveyer bands may be provided so that the clots or pieces of dough pass first through one molder, or one molder and shaper, and through the one circuit of the prover, and then through the second molder and shaper and through the other circuit of the prover, from which it may be delivered and passed either direct into tins, pans or the like, or to another molder and shaping machine, or to a shaping machine, according to the type of loaf required.

When more than two conveyers are required a suitable number of sets of pulleys similar to 20, 22, and tracks are provided, the pulleys (20) for the additional conveyers being arranged at suitably higher levels and so that the said conveyers clear the shafts 21 in a similar manner to that in which the pulleys 20 shown, enable the conveyers thereof to clear the shafts 25, the casing being enlarged accordingly. The additional conveyers may also have elevated looped portions.

I claim:

1. A prover for dough comprising a casing, a plurality of endless conveyers within said casing, each conveyer comprising an endless chain and carriers thereon, means for connecting said carriers to said chain adapted to permit of relative movement between said carriers and chain, and two sets of tracks for guiding said carriers, each set of tracks having an elevated looped portion for inverting said carriers for discharging the dough, whereby two complete and independent circuits are provided for the proving of dough, substantially as hereinbefore set forth.

2. A prover for dough comprising, a casing, two endless conveyers within said casing, said conveyers consisting of endless chains of different length and carriers mounted on said chains, and two sets of tracks for guiding said carriers whereby two independent proving circuits for the dough are formed, one being a much shorter circuit than the other, the tracks for the longer of said circuits being of substantially spiral form, substantially as and for the purpose hereinbefore set forth.

3. A prover for dough comprising, a casing, two endless conveyers within said casing, said conveyers consisting of endless chains of different length and carriers mounted on said chains, and two sets of tracks for guiding said carriers whereby two independent proving circuits for the dough are formed, one being a much shorter circuit than the other, the tracks for the longer of said circuits being of substantially spiral form, and means for driving the chains of said conveyers, substantially as hereinbefore set forth.

In testimony whereof I have signed my name to this specification in the presence of two subscribing witnesses.

LAURENCE EMBREY.

Witnesses:
 MINNIE BERGH,
 PATTIE PLANT.